United States Patent
Thomson et al.

(10) Patent No.: US 11,725,480 B2
(45) Date of Patent: Aug. 15, 2023

(54) FLUID DISCHARGE APPARATUS AND METHOD OF USE

(71) Applicant: Paradigm Flow Services Limited, Drumoak (GB)

(72) Inventors: Ashley Thomson, Drumoak (GB); Alan Vardy, Kirkton (GB)

(73) Assignee: PARADIGM FLOW SERVICES LIMITED, Drumoak (GB)

( * ) Notice: Subject to any disclaimer, the term of this patent is extended or adjusted under 35 U.S.C. 154(b) by 185 days.

(21) Appl. No.: 16/069,363

(22) PCT Filed: Jan. 11, 2017

(86) PCT No.: PCT/GB2017/050063
§ 371 (c)(1),
(2) Date: Jul. 11, 2018

(87) PCT Pub. No.: WO2017/122008
PCT Pub. Date: Jul. 20, 2017

(65) Prior Publication Data
US 2019/0024480 A1  Jan. 24, 2019

(30) Foreign Application Priority Data
Jan. 11, 2016 (GB) .................................. 1600468

(51) Int. Cl.
*E21B 34/14* (2006.01)
*E21B 37/00* (2006.01)
(Continued)

(52) U.S. Cl.
CPC ............ *E21B 34/14* (2013.01); *E21B 21/103* (2013.01); *E21B 34/10* (2013.01); *E21B 37/00* (2013.01);
(Continued)

(58) Field of Classification Search
CPC ........ E21B 34/14; E21B 21/103; E21B 34/10; E21B 37/00; E21B 37/08; E21B 2034/007; F16K 31/58
See application file for complete search history.

(56) References Cited

U.S. PATENT DOCUMENTS 1,433,722 A * 10/1922 Hinderliter ............. E21B 29/00
166/55.2
1,445,581 A * 2/1923 Follop ..................... E21B 31/20
294/86.2
(Continued)

OTHER PUBLICATIONS

Written Opinion and International Search Report, PCT/GB2017/050063; dated Mar. 22, 2017; 15 pages.

*Primary Examiner* — Christopher J Sebesta
*Assistant Examiner* — Neel Girish Patel
(74) *Attorney, Agent, or Firm* — William H. Honaker; Dickinson Wright PLLC

(57) ABSTRACT

The invention provides a fluid discharge apparatus (102) and a method of use. The apparatus (102) comprises a body (106) comprising an inlet (122) configured to receive fluid from a fluid source, and one or more fluid discharge ports (140). A valve arrangement (124) in the body (106) is operable to be cycled to provide an interrupted flow of fluid through the body (106). The valve arrangement (124) may be disposed in the body (106), and/or may be operable to be moved between a first condition in which fluid entering the body (106) from the inlet (122) is prevented from passing through the apparatus (102), and a second condition in which fluid is discharged through the one or more fluid discharge ports (140). The valve arrangement (124) may be operable to cycle between the first condition and the second condition to provide an interrupted flow of fluid through the body (106).

17 Claims, 6 Drawing Sheets

(51) Int. Cl.
*E21B 21/10* (2006.01)
*E21B 37/08* (2006.01)
*E21B 34/10* (2006.01)
*F16K 31/58* (2006.01)

(52) U.S. Cl.
CPC .......... *E21B 37/08* (2013.01); *E21B 2200/06* (2020.05); *F16K 31/58* (2013.01)

(56) References Cited

U.S. PATENT DOCUMENTS

| | | | | |
|---|---|---|---|---|
| 2,897,896 | A * | 8/1959 | Kenneday | E21B 23/02 166/134 |
| 2,904,114 | A * | 9/1959 | Webb | E21B 31/16 294/86.18 |
| 2,980,185 | A * | 4/1961 | Daffin | E21B 23/02 166/123 |
| 3,876,000 | A * | 4/1975 | Nutter | E21B 49/088 166/147 |
| 3,989,114 | A * | 11/1976 | Tschirky | E21B 4/02 175/107 |
| 4,254,983 | A * | 3/1981 | Harris | E21B 31/16 294/86.21 |
| 4,626,134 | A * | 12/1986 | Coumont | E21B 31/20 405/184 |
| 4,817,739 | A | 4/1989 | Jeter | |
| 4,903,776 | A * | 2/1990 | Nobileau | E21B 33/043 166/383 |
| 5,086,844 | A * | 2/1992 | Mims | E21B 43/10 166/212 |
| 5,337,819 | A * | 8/1994 | Tailby | E21B 37/08 166/317 |
| 5,398,760 | A * | 3/1995 | George | E21B 23/01 166/385 |
| 5,398,763 | A * | 3/1995 | Watson | E21B 23/02 166/242.6 |
| 5,398,764 | A * | 3/1995 | Collins | E21B 23/02 166/212 |
| 6,378,612 | B1 * | 4/2002 | Churchill | E21B 34/102 166/321 |
| 6,439,313 | B1 * | 8/2002 | Thomeer | E21B 43/108 166/376 |
| 6,648,335 | B1 * | 11/2003 | Ezell | E21B 33/1295 166/387 |
| 6,820,697 | B1 * | 11/2004 | Churchill | E21B 21/103 175/317 |
| 7,766,084 | B2 * | 8/2010 | Churchill | E21B 21/103 137/115.03 |
| 8,256,504 | B2 * | 9/2012 | Brown | E21B 43/126 417/904 |
| 8,499,840 | B2 * | 8/2013 | Bennett | E21B 43/105 166/242.6 |
| 8,499,844 | B2 * | 8/2013 | Gandikota | E21B 33/128 166/387 |
| 8,733,474 | B2 * | 5/2014 | Nikiforuk | E21B 7/20 175/57 |
| 2003/0173089 | A1 * | 9/2003 | Westgard | E21B 23/02 166/381 |
| 2004/0011566 | A1 * | 1/2004 | Lee | E21B 34/142 166/334.4 |
| 2004/0084190 | A1 * | 5/2004 | Hill | E21B 33/124 166/386 |
| 2004/0129423 | A1 * | 7/2004 | Eddison | E21B 23/006 166/321 |
| 2005/0011650 | A1 * | 1/2005 | Harrall | E21B 43/106 166/207 |
| 2007/0221384 | A1 * | 9/2007 | Murray | E21B 34/063 166/185 |
| 2008/0029268 | A1 * | 2/2008 | Macfarlane | E21B 43/25 166/311 |
| 2009/0056952 | A1 * | 3/2009 | Churchill | E21B 34/14 166/373 |
| 2009/0065196 | A1 * | 3/2009 | Holland | E21B 43/103 166/380 |
| 2010/0224371 | A1 * | 9/2010 | Swan | E21B 33/14 166/373 |
| 2011/0277989 | A1 * | 11/2011 | Frazier | E21B 34/14 166/192 |
| 2011/0284232 | A1 * | 11/2011 | Huang | E21B 34/14 977/775 |
| 2012/0073828 | A1 * | 3/2012 | Churchill | E21B 34/10 166/334.4 |
| 2012/0074722 | A1 * | 3/2012 | Beach | E21B 31/20 294/86.1 |
| 2012/0085539 | A1 * | 4/2012 | Tonnessen | E21B 43/119 166/55 |
| 2012/0168180 | A1 * | 7/2012 | Johnson | E21B 33/1208 166/386 |
| 2013/0037255 | A1 * | 2/2013 | Kash | E21B 43/116 166/55 |
| 2013/0081827 | A1 * | 4/2013 | Etzel | E21B 43/14 166/318 |
| 2013/0186647 | A1 * | 7/2013 | Xu | E21B 33/129 166/207 |
| 2013/0269928 | A1 * | 10/2013 | Zhou | E21B 21/08 166/113 |
| 2013/0306319 | A1 * | 11/2013 | Kolle | E21B 34/10 166/305.1 |
| 2014/0251612 | A1 * | 9/2014 | Powers | E21B 23/00 166/179 |
| 2014/0345878 | A1 * | 11/2014 | Murphree | C09K 8/94 166/377 |
| 2014/0345949 | A1 * | 11/2014 | Cramer | E21B 21/103 175/214 |
| 2014/0374157 | A1 * | 12/2014 | O'Neal | E21B 21/103 175/38 |
| 2015/0337624 | A1 * | 11/2015 | Themig | E21B 34/103 166/317 |
| 2016/0290100 | A1 * | 10/2016 | Williamson, Jr. | E21B 43/12 |
| 2016/0298420 | A1 * | 10/2016 | Shkurti | E21B 23/006 |
| 2017/0130535 | A1 * | 5/2017 | Helvenston | E21B 33/072 |
| 2018/0163509 | A1 * | 6/2018 | Churchill | E21B 34/08 |
| 2019/0003283 | A1 * | 1/2019 | Atkins | E21B 34/10 |
| 2021/0301623 | A1 * | 9/2021 | Fuglestad | E21B 34/10 |
| 2022/0010661 | A1 * | 1/2022 | Shields | F04B 47/04 |

* cited by examiner

FLUID DISCHARGE APPARATUS AND METHOD OF USE

CROSS-REFERENCE TO RELATED APPLICATIONS

The present invention claims priority to PCT International Patent Application Serial No. PCT/GB2017/050063 filed Jan. 11, 2017 entitled "Fluid Discharge Apparatus and Method of Use," which claims the benefit of GB Patent Application Serial No. 1600468.1 filed Jan. 11, 2016, the entire disclosures of the applications being considered part of the disclosure of this application and hereby incorporated by reference.

The present invention relates to a fluid discharge apparatus and a method of use, and in particular to a fluid discharge and apparatus for method of use in the cleaning and/or jetting of fluid conduits. The invention relates generally to fluid conduits and pipelines across a range of industries. Aspects of the invention relate to applications in the hydrocarbon exploration, production and transportation industry, and in particular to methods of jetting deposits and other materials from hydrocarbon pipeline systems.

BACKGROUND TO THE INVENTION

During hydrocarbon production and transportation operations, it is common for the interiors of fluid conduits, including pipelines, wellbores, risers and umbilicals, to become fouled. This fouling can lead to the build-up of layers of debris, scale or particulate matter on the inside of conduits, which reduces the effective inner diameter (ID) of the conduit and reduces the flow rate. Fouling may also produce blockages in the conduits which completely prevent fluid flow through the conduits. Particulate matter may accumulate on the inside of the wellbore during the drilling, completion and/or workover of a well. In addition, sand and other particulate matter may be produced from the formation and accumulate inside the production tubing and may partially or completely block fluid flow through the production tubing, decreasing the production rate and the efficiency of the well.

It is known to use coiled tubing intervention to provide access to pressurised wellbores in wellbore cleanout operations. Coiled tubing is a long continuous length of metal piping wound on a spool, which is straightened by plastic deformation and inserted into the wellbore. In a cleaning application, fluid is circulated through the inside of the coiled tubing and back out through the annulus between the coiled tubing and the wellbore. Particulate matter in the wellbore is brought to surface by the circulating fluid. When performing this type of wellbore operation, it is necessary to employ procedures and equipment for controlling and retaining pressure in the wellbore system to ensure it is isolated from surface. A typical pressure control system includes an injector head that contains a drive mechanism to push and pull the coiled tubing in and out of the hole through a pressure control device.

The coiled tubing injector system described above is a substantial and heavy piece of equipment, with large footprint and high capital expense. The coiled tubing injector system also requires a distance of several metres to be available above the isolation valve to accommodate the injector and the gooseneck. This limits the number of installations where coiled tubing operations can be performed and can make operations more costly. These problems are particularly significant in the case of offshore operations, for example in a turret of a floating production storage production and offloading vessel (FPSO) where space is at a premium and cranes are unable to lift the components into place. Even light coiled tubing units which are used onshore are still substantial pieces of equipment which are large in size and weight in the context of offshore operations.

To alleviate the problems associated with coiled tubing injection such as helical lock-up, coiled tubing thruster systems have been developed. Examples are described in US 2005/247448 and US 2011/277255. The systems use thruster pigs on the end of the coiled tubing to create an additional force on the coiled tubing which enables it to be deployed to greater depth. Fluid is pumped down the annulus between the wellbore wall and the coiled tubing, and applies pressure against the thruster pig, before the fluid passes out of in front of the bottomhole assembly. The fluid then returns to surface through the bore of the coiled tubing.

Other considerations limit the applications of coiled tubing. Firstly, blockages and restrictions can occur in narrow bore fluid conduits, which are simply too small to receive coiled tubing. In addition, the coiled tubing injector systems described above rely on the rigidity of the coiled tubing to allow it to be pushed into a hole, rather than relying on gravity only (as is the case in wireline operations). However, this rigidity also has drawbacks that make coiled tubing interventions unsuitable for some applications. For example, it may not be possible to inject coiled tubing into a fluid conduit which has a deviated or convoluted path. In extreme cases, the rigid coiled tubing may not be able to pass through some curved or bent pipeline systems. Even where passage is possible, the frictional resistance between the coiled tubing and the inside wall of the wellbore will limit the depth to which the coiled tubing can be deployed. For the foregoing reasons, the wellbore cleanout systems according to the prior art are generally unsuitable for applications other than the cleaning of wellbores.

WO2012/140432 and WO2014/102549 describe methods of cleaning a fluid conduit in a hydrocarbon production installation by introducing a flexible hose into a fluid conduit system through a pressure control device and running the flexible hose into a conduit to be cleaned while a fluid stream flows in the conduit. In the case of WO2014/102549, the system includes a thruster arrangement for the controlled deployment of the apparatus. The flexible hose is capable of being flexed or bent without plastic deformation of the hose material and/or without imparting significant levels of fatigue. This enables the apparatus to be deployed through deviated or highly convoluted paths, and therefore facilitates application to a wide range of cleaning operations.

While the flexible hose systems of WO2012/140432 and WO2014/102549 address deployment issues associated with convoluted paths and increasing depth or reach of the equipment, they are limited in their ability to discharge fluid with sufficient jetting power to forcibly dislodge or loosen material such as debris or scale from a pipeline wall at significant depths or reaches. One factor limiting jetting power for any fluid conduit system is the frictional losses in the pumped fluid as it flows in the hose.

SUMMARY OF THE INVENTION

There is generally a need for a method and apparatus which addresses one or more of the problems identified above.

It is amongst the aims and objects of the invention to provide an apparatus and method of use which obviates or mitigates one or more drawbacks or disadvantages of the prior art.

It is amongst the aims and objects of the invention to provide a fluid discharge apparatus and a method of use which provides effective jetting power at large distances and/or deployment depths.

It is amongst the aims and objects of the invention to provide an apparatus and method for cleaning a fluid conduit which obviates or mitigates one or more drawbacks or disadvantages of the prior art.

It is amongst the aims and objects of the invention to provide an apparatus and method for cleaning a fluid conduit with improved deployment depth.

It is a further aim and object of the invention to provide a fluid discharge apparatus which provides an interrupted fluid flow for intermittent jetting.

Further aims and objects of the invention will become apparent from reading the following description.

According to a first aspect of the invention, there is provided a fluid discharge apparatus comprising:
a body, the body comprising an inlet configured to receive fluid from a fluid source, and one or more fluid discharge ports; and
a valve arrangement operable to be cycled to provide an interrupted flow of fluid through the body.

The valve arrangement may be disposed in the body, and/or may be operable to be moved between a first condition in which fluid entering the body from the inlet is prevented from passing through the apparatus, and a second condition in which fluid is discharged through the one or more fluid discharge ports. The valve arrangement may be operable to cycle between the first condition and the second condition to provide an interrupted flow of fluid through the body.

Preferably, the valve arrangement is operable to cycle between the first condition and the second condition under the effect of a pressurised fluid entering the body from the inlet. Preferably, the valve arrangement is operable to be passively operated, without external intervention or operation, such that a pressurised fluid source causes the valve arrangement to cycle between the first condition and the second condition to provide an interrupted flow of fluid through the body.

The apparatus may comprise a fully open condition, which may define a maximum flow area of a flow path through the apparatus. The apparatus may comprise a partially open condition, which may define a flow path through the apparatus with a flow area less than the maximum flow area. Preferably, the partially open condition comprises a range of partially open positions, which may be continuous between the first condition and the fully open condition. The range of partially open positions may define a range of flow areas of a flow path through the apparatus, which may be continuous between a closed condition and the fully open condition. The range of partially open positions, which may define a range of pressure drops across the apparatus, dependent on a flow rate of fluid through the apparatus, the flow area of the flow path, and pressure.

The valve arrangement may comprise a cartridge valve. The valve arrangement may comprise a piston, which may be a cartridge piston. The piston may be disposed in an axial bore in the body, and/or may be operable to move axially in the body. The piston may comprise a sleeve or spool member. The valve arrangement may comprise a stem, which may be disposed in a bore of the piston, and the piston may be arranged to move axially with respect to the stem.

The stem may comprise one or more flow apertures, which may be radially oriented in the stem and/or apparatus. The piston may comprise one or more flow apertures, which may be radially oriented in the piston and/or apparatus.

The apparatus preferably defines a first chamber between the inlet and a seal in the valve arrangement. The seal may be a circumferential seal around the piston, and/or may be a circumferential seal between the piston and the body. The seal may be a metal-to-metal seal.

The apparatus may comprise a biasing means which biases the valve arrangement towards the first condition. The biasing means may comprise one or more springs, and may comprise one or more washer springs (e.g. Belleville springs).

The piston may define an active piston area in the first condition of the apparatus, which may be a first active piston area. Pressure acting on the first active piston area may move the piston from the first condition. Preferably, the piston is operable to move from the first condition when pressure acting on the first active piston area exceeds a predetermined opening pressure.

The piston may comprise a second active piston area, and pressure acting on the second active piston area may be operable to move the piston from a partially open position towards the fully open condition.

Preferably, the second piston area is larger than the first piston area.

The first piston area may be formed on a face on an interior profile of the piston. The second piston area may be formed on a face on an exterior profile of the piston. One or both of the piston areas may be annular faces, and may be conical annular surfaces.

According to a second aspect of the invention there is provided a system comprising the fluid discharge apparatus according to the first aspect of the invention, and a fluid line coupled to the inlet of the fluid discharge apparatus.

Embodiments of the second aspect of the invention may include one or more features of the first aspect of the invention or its embodiments, or vice versa.

According to a third aspect of the invention there is provided method of cleaning and/or jetting the interior of a fluid conduit, the method comprising:
providing an assembly comprising a fluid discharge apparatus coupled to the end of a tubing;
locating the assembly in a fluid conduit;
pumping fluid from a fluid source through the tubing to the fluid discharge apparatus; and interrupting flow of fluid to one or more discharge ports of the apparatus.

Preferably, the method comprises interrupting flow of fluid to generate or maintain fluid pressure at the apparatus.

The method may comprise cycling a valve arrangement of the apparatus between a first condition in which fluid entering the body from the inlet is prevented from passing through the apparatus, and a second condition in which fluid is discharged through one or more discharge ports to provide an interrupted flow of fluid through the apparatus.

The method may comprise deploying the assembly in the fluid conduit, which may comprise providing a thrust from the apparatus to assist in deployment of the assembly.

The method may comprise circulating fluid from the assembly to a deployment location, which may comprise returning fluid via an annulus between the tubing and the fluid conduit.

The fluid conduit may be a hydrocarbon production or transportation pipeline.

The method may comprise loosening and/or removing material from an inner wall of the fluid conduit.

The method may comprise deploying the apparatus in multiple stages, with sequentially increasing hose lengths.

Embodiments of the third aspect of the invention may include one or more features of the first or second aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

The invention has application to cleaning operations for subsea pipelines, including blockage and/or debris removal, and is particularly advantageous in cleaning operations in which the pipeline is accessed from surface via a marine, catenary and/or flexible riser. Accordingly, the invention will be described in the context of such an operation by way of example only.

Figure 1:
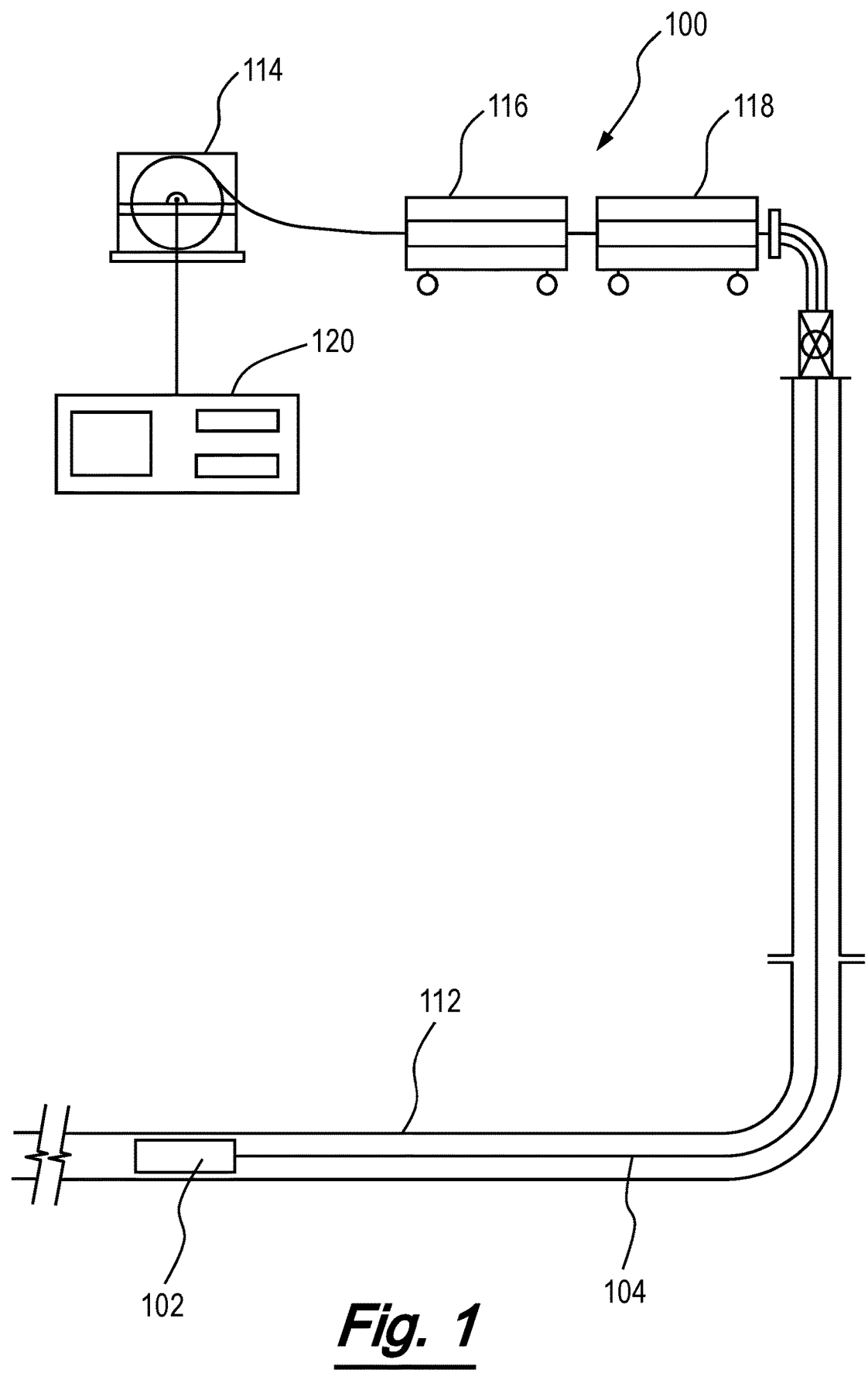
FIG. 1 is a schematic representation of a system incorporating an apparatus according to an embodiment of the invention.

Referring firstly to FIG. 1, there is shown a system according to an embodiment of the invention, generally depicted at 100. System 100 is formed from a fluid discharge apparatus 102 and a flowline 104, which in this case is a flexible hose. The apparatus 102 and flexible hose are shown here in situ in a fluid conduit 112, which in this case is a subsea pipeline accessed by a production riser. The apparatus 102 and the flexible hose 104 are deployed from a storage reel 114 via an injector unit 116 and a pressure control device 118, comprising a stripper and blowout preventer (BOP) unit.

The injector unit 116 comprises a drive mechanism for pushing and/or pulling the pipe into and out of the fluid conduit through the pressure control apparatus 118. The drive mechanism comprises an arrangement of blocks shaped and sized to engage with the outer surface of the flexible hose.

The stripper comprises internal pack off elements formed from an elastomeric material, arranged to provide a fluid seal with the outer surface of a flexible hose passing through the unit. The stripper allows the flexible hose to pass through the apparatus while retaining pressure in the conduit system beneath the stripper.

The blowout preventer comprises a shear and seal blowout preventer, which has the capability to cut or otherwise sever flexible hose introduced to the fluid conduit. This embodiment also comprises a chamber which functions as a lubricator, providing an access point for the coupling of the apparatus 102 to the hose. A divertor (not shown) is also provided to create a fluid outlet for fluid returns in the annulus between the introduced flexible hose and the inner surface of the fluid conduit 112.

A control module 120 communicates with the other elements if the system to control its operation and receive data collected from the apparatus 100. The control module comprises a pump and an arrangement of valves.

The hose itself is a composite hose comprising a plastic inner core (which may be polyamide or polyoxymethylene), a plastic outer layer (which may be a polyamide) and at least one metal layer disposed between the inner core and the outer layer. The outer layer therefore has a lower coefficient of friction than a metal surface of coiled tubing. The minimum elastic bending radius is a convenient way of measuring the flexibility of a hose. The flexible hose has a minimum elastic bending radius of less than 40 times the inner diameter of the hose. In certain embodiments, the flexible hose has a minimum elastic bend radius of less than 20 times the inner diameter of the tubing, for example approximately 12 times the inner diameter of the tubing in a preferred embodiment of the invention.

Figure 2:
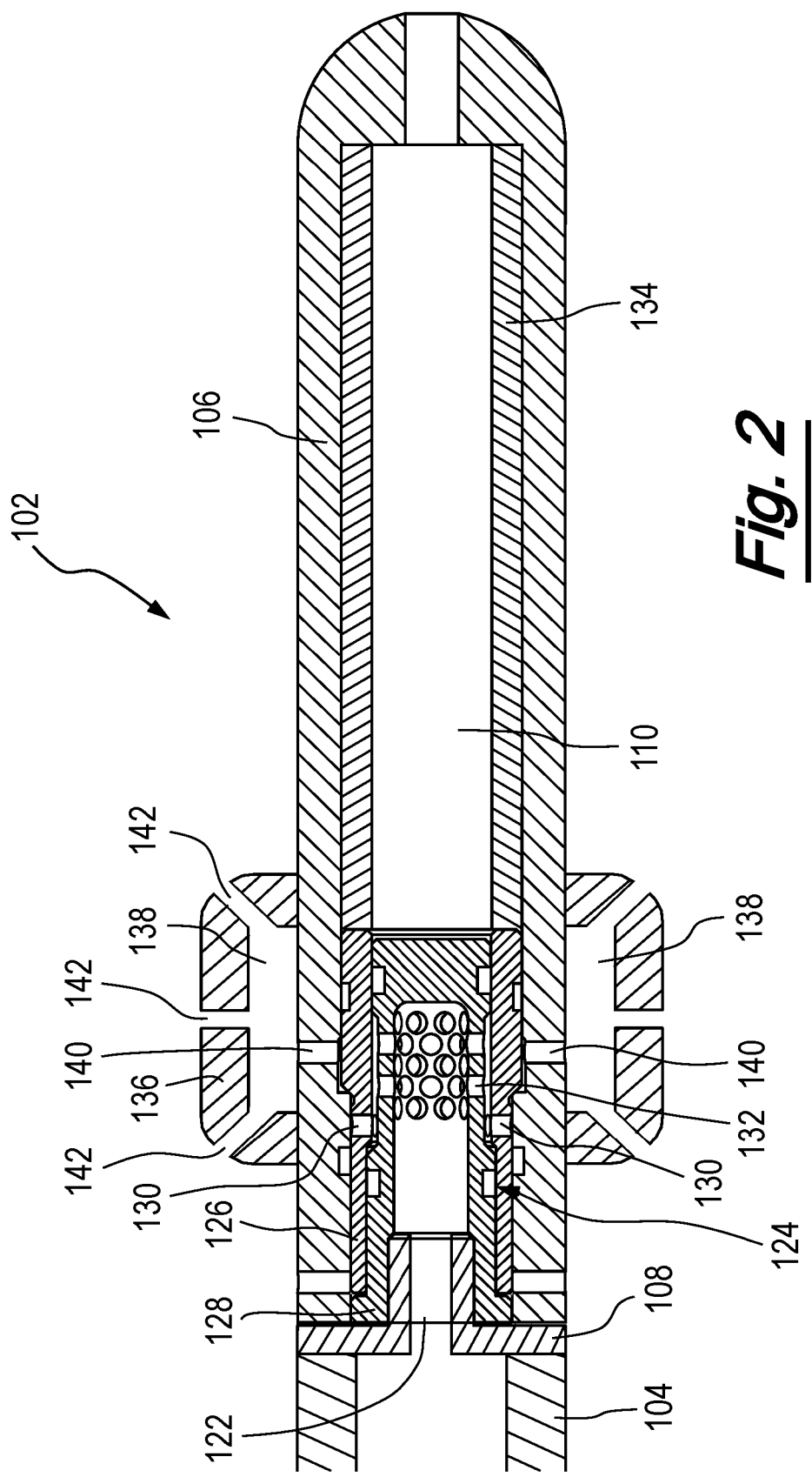
FIG. 2 is a sectional view of a fluid discharge apparatus according to an embodiment of the invention.

FIG. 2 shows the apparatus 102 and hose 104 in more detail. The apparatus 102 comprises a body 106 coupled to the flexible hose 104 by a connector 108. The body defines a bore 110 comprising an inlet 122 which is continuous with a flow bore of the flexible hose 104. Disposed within the bore 110 is a valve arrangement in a form of a cartridge valve, generally shown at 124. The cartridge valve 124 comprises a cartridge piston 126 arranged axially within the bore 110. Disposed within the cartridge piston 126 is a valve stem 128.

The cartridge piston is operable to move axially within the body 106. In abutment with the cartridge piston is a biasing means in the form of an arrangement of spring washers, generally shown at 134. The arrangement of spring washers (which may be Belleville washers) functions to bias the valve arrangement towards a first, closed position shown in FIGS. 2 and 3.

Arranged around the body 106 is a nozzle ring, generally shown at 136, which defines an internal annular volume 138 in fluid communication with the interior of the body via discharge port 140. The nozzle ring 136 comprises a number of nozzle apertures 142 arranged around the nozzle ring. The nozzle ring therefore enables fluid jetting from the apparatus in a configuration desired for a particular operation. The nozzle ring is configurable by varying nozzle sizes and/or blanking off nozzle apertures with threaded inserts (not shown).

Figure 3:
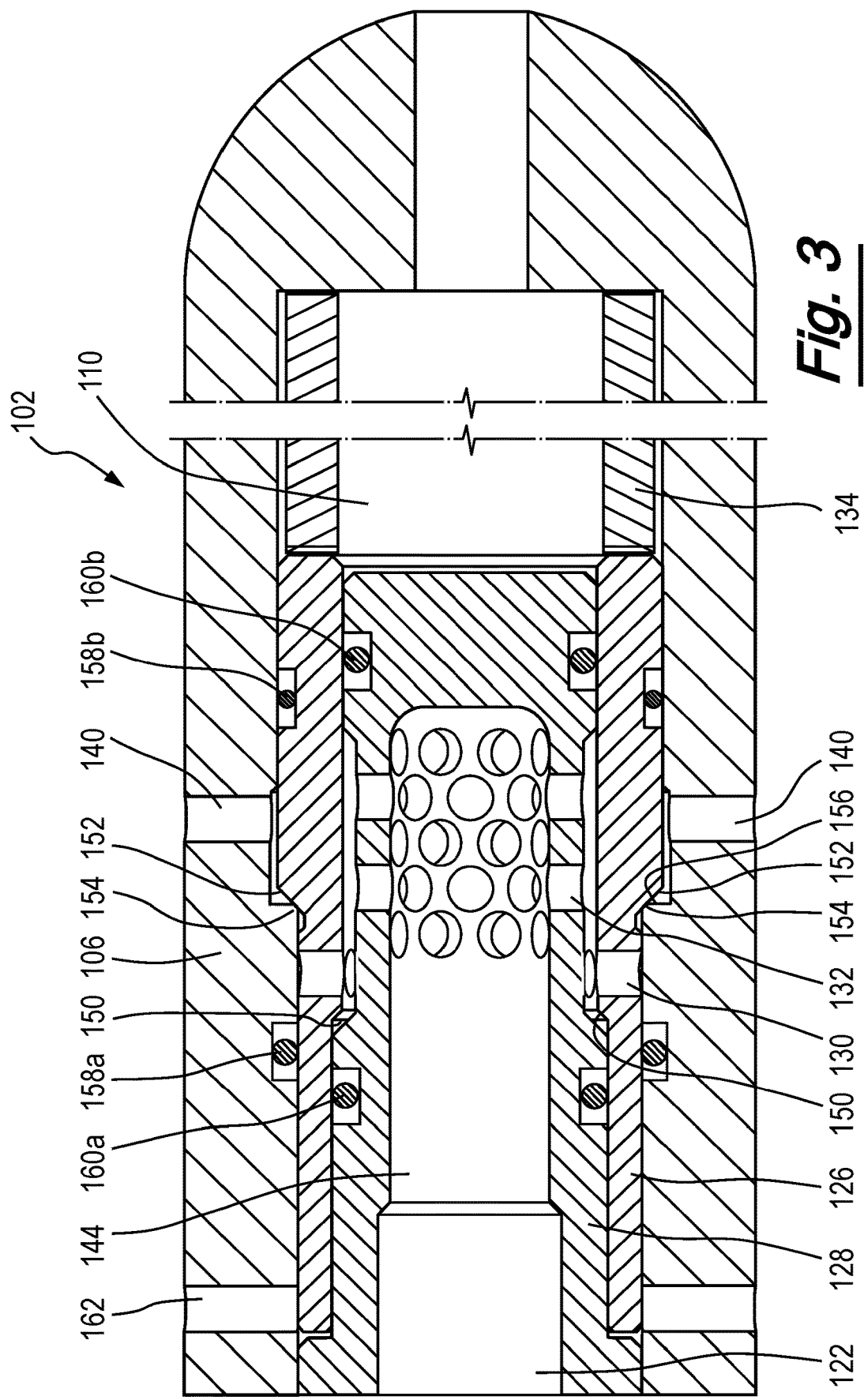
FIG. 3 is an enlarged sectional view of a part of the apparatus of FIG. 2.

FIG. 3 is an enlarged view of the apparatus 102 in isolation, without the flexible hose 104 and nozzle ring 136.

The stem 128 defines an internal cavity 144 which receives pressurised fluid from the hose 104 via the inlet 122. The stem comprises radially oriented apertures 132 which extend from the cavity 144 to the outer surface of the stem, and are distributed axially and circumferentially. The piston 126 comprises radially oriented apertures 130 distributed circumferentially around the piston. The cavity 144 is in fluid communication with the exterior of the cartridge piston via apertures 130 and 132.

The cartridge piston 126 is in the general form of a cylindrical sleeve with internal and external stepped profiles. The internal profile comprises a first portion with a first inner diameter, and a second portion with a second, reduced inner diameter. Between the first and second portions is a conical interior face 150 which defines a first active piston area of the piston 126. The external profile of the cartridge piston comprises a first portion with a first outer diameter, and a second portion with a second, greater outer diameter. Between the first and second portions is an exterior conical face 152 which provides a second active piston area in use.

The surface 152 also provides a metal sealing surface for a metal-to-metal seal 154 between the outer diameter of the cartridge piston and a seal shoulder 156 in the bore 110. The exterior conical face 152 is selected to be larger than the interior conical face 150, such that the second active piston area is larger than the first active piston area.

Elastomeric seals 158a and 158b are provided between the cartridge piston 126 and the body 106, and elastomeric seals 160a and 160b are provided between the valve stem 128 and the cartridge piston 126 on its inner diameter.

A hole in the leading portion of the body pressure balances the bore and spring cavity. The body 106 is also provided with fluid drain holes 162 which pressure balance the device and allow the piston cartridge to move between its respective operating positions.

The apparatus is configured to discharge fluid from the discharge ports into the nozzle ring and into a fluid conduit in which the apparatus is deployed, when a pressurised fluid is provided to the apparatus via a connected flexible hose. The discharged fluid creates fluid jets which are directed towards material such as wax, scale, and/or other deposits in the fluid conduit to physically dislodge or loosen it from the fluid conduit. The nozzles may also be directed towards the rear of the tool to provide forward thrust to move the assembly forwards in the pipeline. The apparatus provides an interrupted fluid flow through the system in order to improve jetting performance. There will now be described a mode of operation of the apparatus with reference to FIGS. 4A to 4I, which are selected positions of the apparatus through its operating cycle in a pipeline. For clarity of the drawings, the arrangement of spring washers 134 and the nozzle ring 136 are omitted from the drawings, as is the flexible hose and its connector.

Figure 4A:
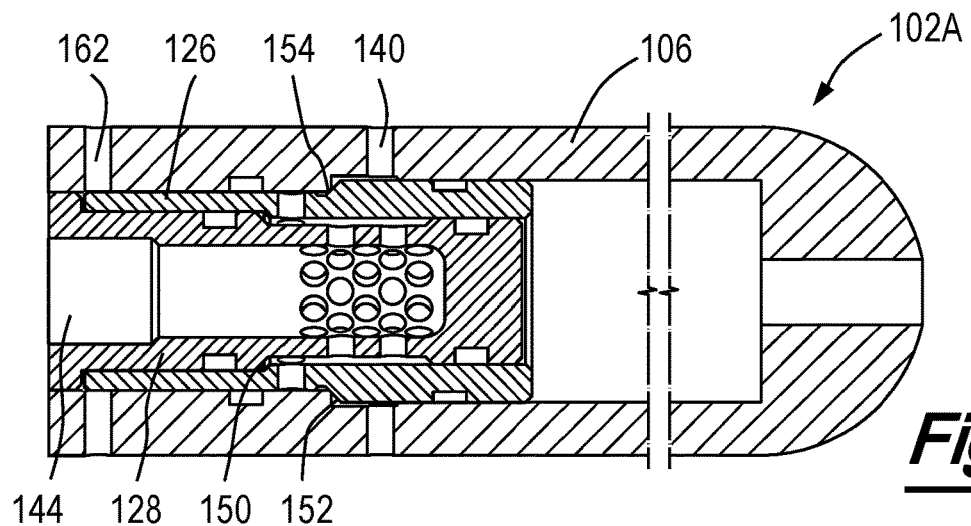
FIGS. 4A to 4I are sectional views of the apparatus according to an embodiment of the invention in various operational conditions.

FIG. 4A shows the apparatus in a first, closed condition 102A, in which the valve arrangement prevents fluid flow through the apparatus. The exterior of the apparatus, and therefore the leading part of the bore 110, fluid discharge ports 140 and drain holes 162, are exposed to the ambient pressure in the pipeline. The cavity 144 is in fluid communication with the flexible hose, which receives fluid pumped from a fluid source at an elevated pressure (higher than the ambient pressure in the pipeline). Pressure acts on the active piston area 150 of the internal face of the piston 126, but the spring washers (not shown) act on the cartridge piston 126 to retain it against the stem 128 (leftmost in the drawings). The internal pressure in the cavity 144 and hose is less than a pressure threshold required to move the cartridge piston 126 axially against the preload of the springs. The internal pressure increases as fluid is pumped from the fluid source.

Figure 4B:
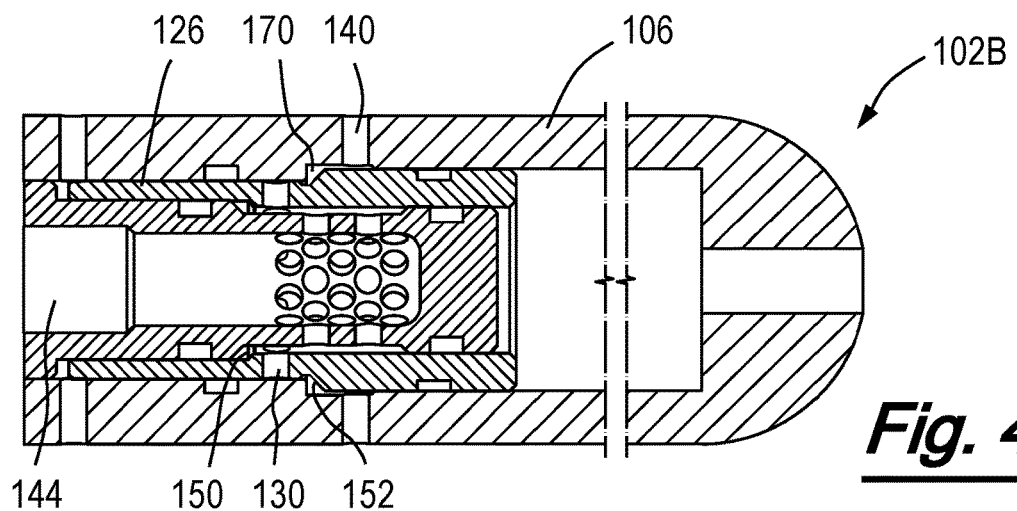

FIG. 4B shows the apparatus in a condition 102B, in which the internal pressure has increased to a pressure sufficient that the force on the active piston area 150 overcomes the preload force of the springs. The piston 126 moves axially in the bore 110 with respect to the body 106 and the stem 128 (right in the drawings). In the position 102B, the metal-to-metal seal 154 is broken, and therefore some leakage of fluid between the apertures 130 and an annular chamber 170 defined between the piston and the body will occur. This leakage is minimised by the close tolerance and small radial clearance between the outer diameter of the piston and the inner diameter of the body (which preferably is less than 0.01 mm). The fluid leakage does not prevent the internal pressure in the cavity 144 increasing as fluid is pumped from the fluid source, and the spring continues to be compressed as the internal pressure rises.

Figure 4C:
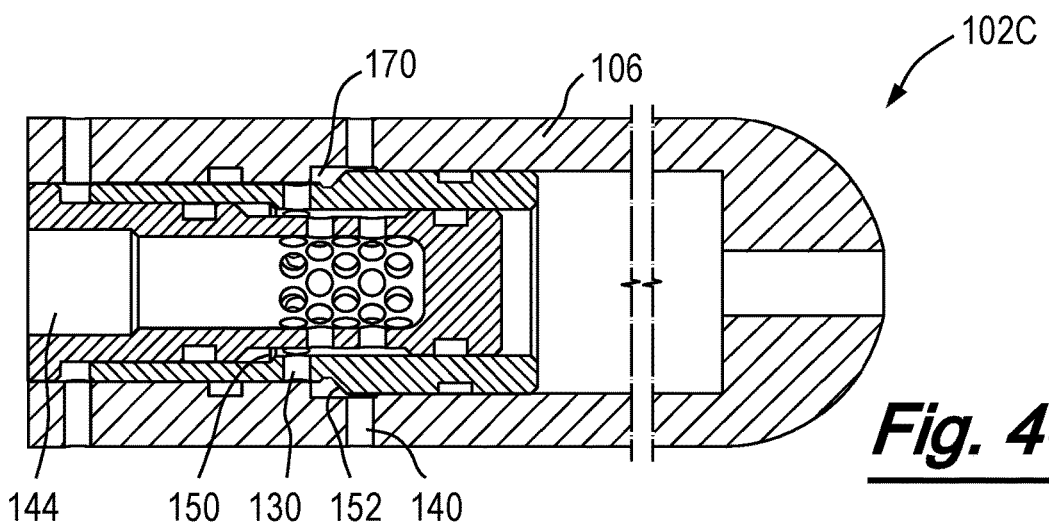

FIG. 4C shows the apparatus in a partially open condition 102C. The internal pressure has reached a threshold required to move the piston to a position at which the radial aperture 130 is in direct fluid communication with the chamber 170, and flow rate from the cavity 144 to the fluid discharge port 140 and the outside of the apparatus increases rapidly. Chamber 170 becomes pressurised, resulting in an overall drop in pressure within the apparatus. However, with the chamber 170 pressurised, piston area 152 on the external face of the piston becomes active. The force on the piston is therefore sufficient to continue to move the piston against the springs (left to right in the drawings), providing that the internal pressure does not drop below a 'set close' pressure threshold. In this condition, the flow rate is initially small and the internal pressure is initially high.

Figure 4D:
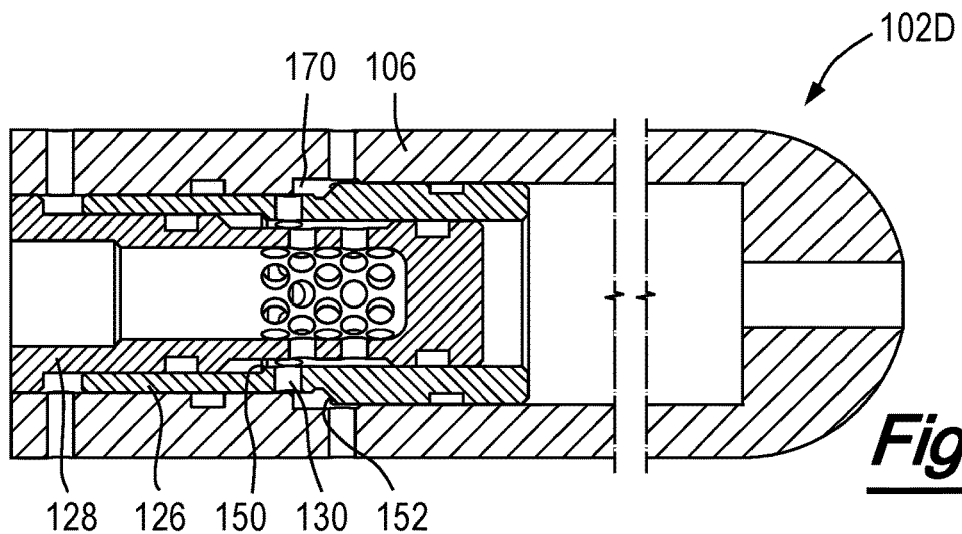

FIG. 4D shows the apparatus in a partially open condition 102D, in which the piston has moved further against the springs (left to right in the drawings). As the piston moves, the rate of change of the flow rate reduces, and the internal pressure decreases. The radial flow path through the apparatus increases as the aperture 130 moves into alignment with the chamber 170.

Figure 4E:
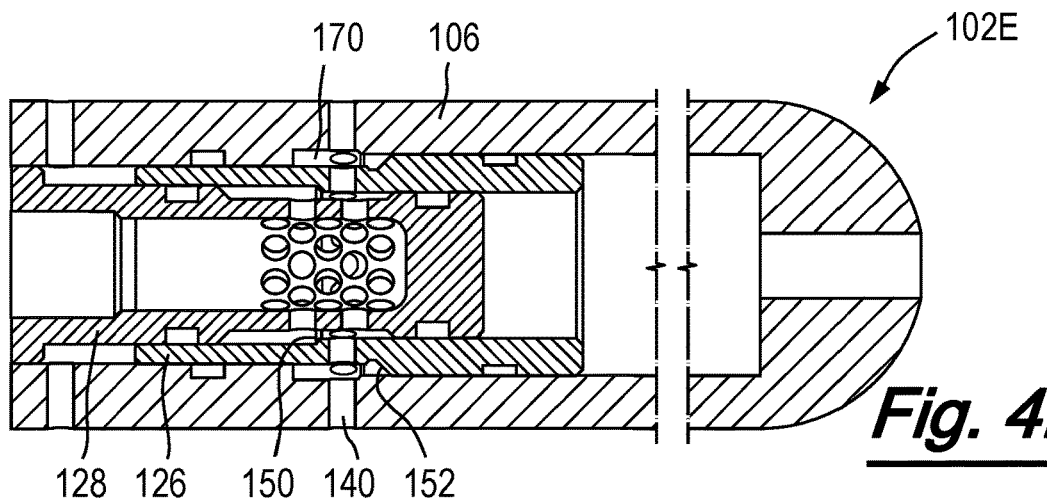

FIG. 4E shows the apparatus in a fully open condition 102E. The cartridge piston 126 is fully stroked, with further travel prevented by a mechanical stop (not shown). This is the position of maximum unrestricted radial flow path between the cavity 144 and the exterior of the apparatus. The apparatus remains in this condition while the internal pressure exceeds a critical 'set close' pressure, at which the hydrostatic load on the piston faces 150, 152 is less than the spring load. Flow rate in this condition is relatively high.

Figure 4F:
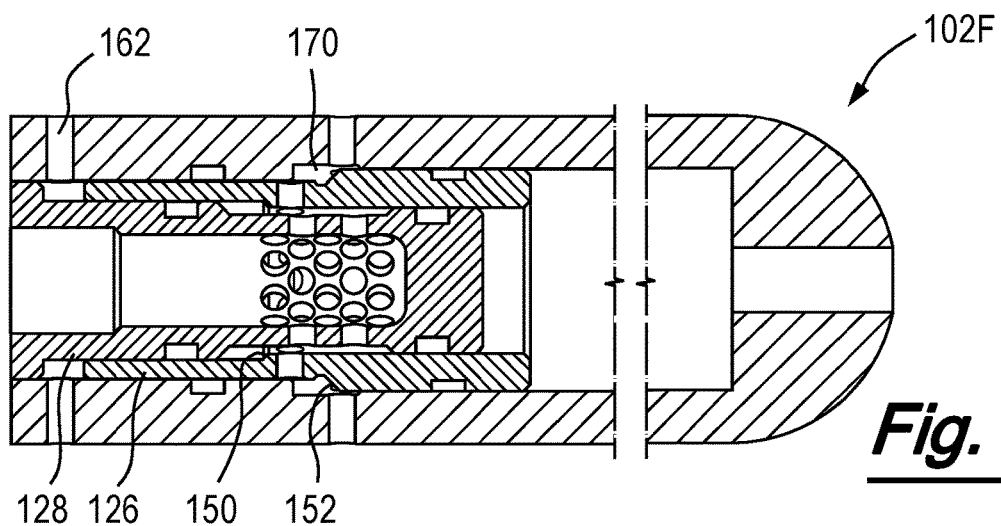

FIG. 4F shows the apparatus in a condition 102F, at which the critical pressure has been reached. The spring load now exceeds the hydrostatic load on the piston faces 150, 152, and the cartridge piston now begins to move towards the stem (right to left in the drawings) as the pressure continues to drop. The radial flow path area from the cavity 144 to the exterior of the apparatus begins to reduce and become more restricted, while the flow rate is relatively high. This results in an increasing pressure drop across the cartridge piston between the cavity 144 and the pressure acting on the piston area 152 in the cavity 170, reducing the relative pressure acting on the piston area 152. Conversely, the relative pressure acting on the piston area 150 is increasing, relative to the pressure in the cavity 170. However, the active piston area 152 is significantly larger than the active piston area 150, and the net hydrostatic force on the cartridge 126 continues to reduce, and the spring load continues to move the cartridge towards the stem (right to left in the drawings). As the piston moves towards the stem and towards a closed position, fluid is drained through the drain holes 162.

Figure 4G:
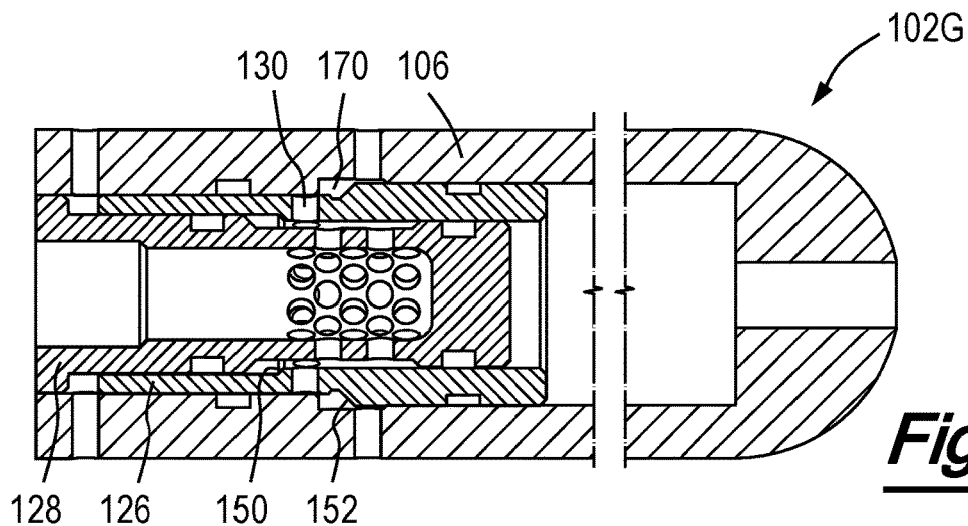

FIG. 4G shows the apparatus in a partially closed condition 102G, in which the apertures 130 are retracted into the bore 110 such that the aperture 130 is not in direct fluid communication with the chamber 170. The chamber 170, the discharge port 140 and the nozzle ring discharge to the ambient pipeline pressure. In this condition, the flow rate is initially high, and the internal pressure is initially low compared with the condition 102C in the opening phase of the cycle. The fluid continues to be pumped from the fluid source, and although the pressure in the hose and cavity 144 is increasing, the pressure is only acting on the piston area of face 150. This piston area is relatively small, and is overcome by the load of the springs as the spring force is much greater than the hydrostatic force.

Figure 4H:
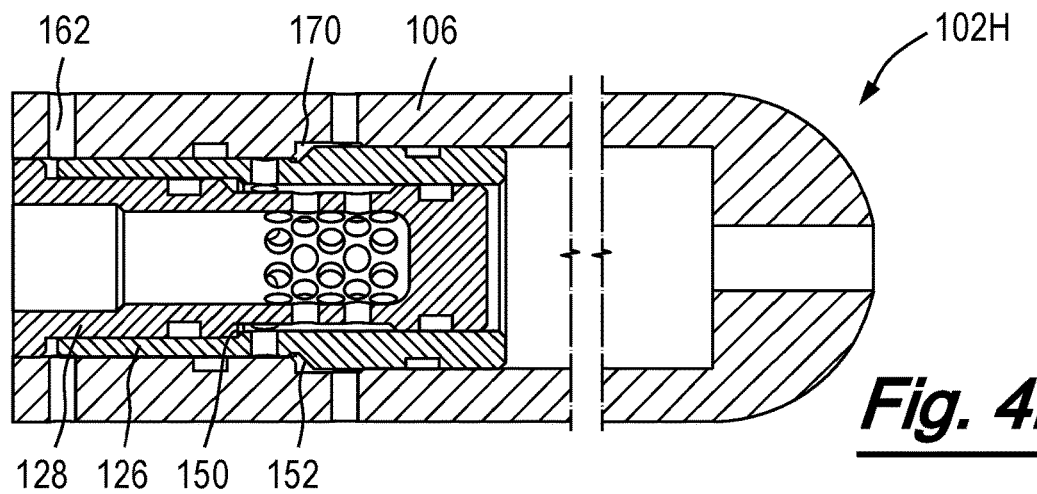

FIG. 4H shows the apparatus in a partially closed condition 102H in which the piston has moved further away from the springs (left to right in the drawings). As the piston 126 moves towards the stem 128 and towards a closed position, the flow paths between the chamber 170 and the discharge ports 140 are restricted. This provides a degree of hydraulic dampening or cushioning as the piston approaches the point of contact of the metal-to-metal seal, to reduce the impact on the metal seal and increasing its longevity. Fluid drain holes 162 are also restricted to provide hydraulic dampening between the piston 126 and the stem 128.

Figure 4I:
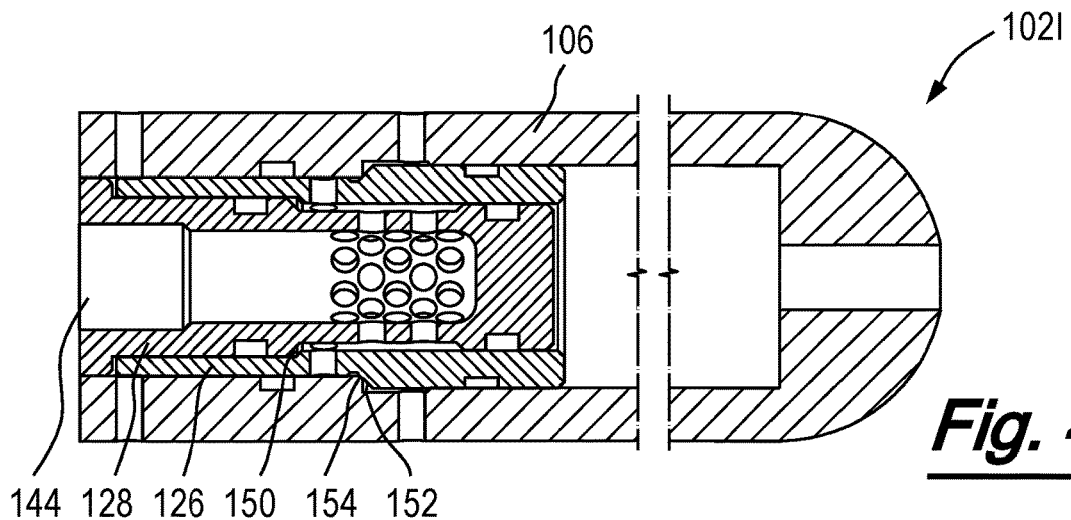

FIG. 4I shows the apparatus in its fully closed condition, 102I, at the end of the cycle. This condition is the same as the condition 102A, and no flow is permitted through the apparatus. Fluid continues to be is pumped from the fluid source, and the cycle begins again with the internal pressure in the cavity 144 increasing as described with reference to FIG. 4A.

Through the cycle described above, the apparatus provides interrupted fluid flow through the apparatus to create discrete, repeated phases of pressure build up and fluid discharge. The apparatus therefore creates a series of pulsed fluid jets in the pipeline. During a pressure build up phase, flow is not permitted through the apparatus, mitigating the effects of frictional losses in the fluid which would otherwise occur in a fluid flow phase.

An additional advantage of the pulsation of fluid discharge is that the assembly of the hose and apparatus is vibrated in use, which causes a mechanical movement of the hose and/or apparatus which temporarily reduces the friction between the assembly and the pipeline.

During a fluid discharge phase, fluid jets emanate from the apparatus (via the nozzle ring), and optionally the apparatus may also be configured to generate thrust on the apparatus. The proportion of jetting and thrust force is dependent on the configuration of the nozzle ring, and in particular the size, distribution, and respective direction of nozzles. The proportion of thrust and jetting power will be tuned for a particular operation by selection and/or configuration of the nozzle ring.

The apparatus generates jetting power and/or thrust through its discharge phase, which in turn is dependent on the pressure thresholds to which the apparatus is configured. For a given fluid source pump capacity, the gap between a 'set open' pressure (at which the tool opens flow to the jetting nozzles) and a 'set close' pressure (at which flow to the jetting nozzles is closed) determines the operating parameters of the apparatus, including (i) the frequency of the operating cycle; (ii) the volume of fluid discharged; (iii) thrust; and (iv) the period through which the thrust is available. In a typical example the set open pressure may be in the range of 4,000 psi to 5,000 psi (e.g. around 4,500 psi) and the set close pressure may be in the range of 1,500 psi to 2,500 psi (e.g. around 2,000 psi). In operation, the critical set open pressure and critical set close pressure are affected by the ambient pressure in the annulus of the pipeline at maximum depth [ ].

The apparatus configured to provide sufficient thrust (in terms of force and thrust duration) required to enable the apparatus to reach the full required depth, which means the thrust must be capable of overcoming the cumulative horizontal friction of the apparatus and the hose in the pipeline. During the thrust period, fluid is flowing through the hose and apparatus, and frictional losses are experienced through the length of hose through which the fluid is pumped through the hose from the fluid source to the apparatus. These frictional losses limit the rate at which the apparatus may be deployed in the pipeline.

In order to improve the rate of deployment, in a particular mode of operation, the apparatus may be used in multiple stages, with sequentially increasing hose lengths. In the first operational stage, the apparatus is deployed with a reduced hose length (i.e. one which is not capable of reaching full depth). Thus the frictional losses during the thrust period are only experience over the reduced hose length, enabling increased thrust than would otherwise be the case, and increasing the rate at which the apparatus may be deployed.

In a second operational stage, an additional length of hose is connected to the first length, so that the combined hose is capable of reaching part way to the maximum deployment depth. The increased length of the combined hose increases the frictional losses during the thrust stage, but the losses are still less than those that would be experienced with the full hose length. This enables deployment at an intermediate deployment rate.

In a final operational stage, a third length of hose is connected so that the combined hose can reach the maximum required depth. The fluid is now pumped through the entirety of the combined hose, and the frictional losses during the thrust stage are greater. This reduces the deployment rate, but the relatively slow deployment is only required over the final operational stage, rather than the entire operation.

Alternatively, or in addition, where it is acceptable to pull the assembly from the pipeline, it is possible to run the apparatus in a first operational stage with a configuration designed to optimise thrust according to the depth required for that particular operational stage. For example, thrust power and/or duration may be reduced for the first operational stage to enable improved jetting power and/or to take advantage of reduced frictional losses. After the apparatus is pulled to surface, the nozzle ring can be changed out and/or reconfigured for a nozzle ring providing different thrust and jetting parameters, required for that stage of the operation (for example increased thrust at the expense of reduced jetting and/or deployment rate).

In particular modes of operation, additional measures are taken to mitigate issues due to cumulative friction of the hose in the pipeline and/or riser. For example, the pipeline may be filled with brine with a density greater than freshwater, for example a calcium chloride brine. This increases the buoyancy of the flexible hose and the apparatus in the pipeline, and may in some cases render the assembly neutrally buoyant to significantly reduce the friction in the system, and in some embodiments virtually eliminate the contribution to friction in a horizontal portion of the pipeline. The apparatus may in some embodiments be formed from or integrated with low density material such as syntactic foam or other buoyancy materials. In one embodiment the body of the apparatus is formed mainly from an aluminium alloy, and is provided with syntactic foam sheath which functions to centralise the apparatus in a pipeline and reduce the density and frictional losses as the assembly is deployed into and/or pulled from the pipeline.

In an alternative embodiment, the nozzle ring is supported in a manner that it is free to rotate, for example, by mounting on roller bearings. The nozzle ring may be designed such that some of the nozzles have a tangential component. When jetting, these nozzles will therefore create a rotational moment (torque) which would tend to induce a 'spin' of the nozzle ring if the ring is rotationally mounted. Rotation of the nozzle ring may result in generally beneficial jetting 'coverage' over full 360 degrees.

In certain embodiments, the fluid returns velocity may not be sufficiently high to lift solid particles and/or debris removed from the pipeline and return them to surface, without the solids settling out into the pipeline. The return of solids may be enhanced by using an additive such as a cellulose fibre additive which retains particles in suspension and facilitates their return. An example of such an additive is the additive marketed as UPTAKE™ by Pipeline Cleaning Solutions Limited.

The foregoing embodiment is described in the context of a flexible composite hose, which has relatively low density, low coefficient of friction, and capacity to be bent or flexed repeatedly without significant damage to the hose material. However, the invention also has application to other tubing types, including, for example coiled tubing or composite pipe. In such alternative applications, the apparatus may be configured with different fluid discharge characteristics. For example, a stiffer tubing such as coiled tubing or composite pipe may have the capacity to receive additional pushing and/or pulling force from the surface, and/or may require lower thrust to deploy the apparatus to the required depth. Consequently, the apparatus may be configured to provide additional jetting force at the expense of thrust. This may be manifested as a smaller gap between the set-open and set-close pressures, resulting in higher frequency (shorter duration) discharge pulses at high jetting pressure.

In a variation to the above-described embodiment, the seal between the body and the piston in the closed condition (implemented as a metal-to-metal seal in apparatus 102) may be omitted, with reliance on low or negligible leakage through the system in a closed condition from close or tight tolerances between the outer diameter of the piston and the inner diameter of the body.

The invention provides a fluid discharge apparatus and a method of use. The apparatus comprises a body comprising an inlet configured to receive fluid from a fluid source, and one or more fluid discharge ports. A valve arrangement in the body is operable to be cycled to provide an interrupted flow of fluid through the body. The valve arrangement may be disposed in the body, and/or may be operable to be moved between a first condition in which fluid entering the body from the inlet is prevented from passing through the apparatus, and a second condition in which fluid is discharged through the one or more fluid discharge ports. The valve arrangement may be operable to cycle between the first condition and the second condition to provide an interrupted flow of fluid through the body.

The invention to provides an apparatus and method of use which obviates or mitigates one or more drawbacks or disadvantages of the prior art. The invention provides effective jetting power at large distances and/or deployment depths. The invention is particularly effective in applications to cleaning hydrocarbon pipelines, as it enables improved deployment depth. The fluid discharge apparatus provides an interrupted fluid flow for intermittent jetting.

Various modifications to the above-described embodiments may be made within the scope of the invention, and the invention extends to combinations of features other than those expressly claimed herein.

What is claimed is:

1. A fluid discharge apparatus for cleaning and/or jetting the interior of a fluid conduit, the fluid discharge apparatus comprising:
   a body, the body comprising an inlet configured to receive fluid from a fluid source, and one or more fluid discharge ports; and
   a valve arrangement disposed in the body and passively operable to be cycled to provide an interrupted flow of fluid through the body by moving between a first condition and a second condition via a partially open condition to provide said interrupted flow of fluid through the body, wherein in the first condition fluid entering the body from the inlet is prevented from passing through the apparatus, wherein in the second condition a flow path having a maximum flow area through the apparatus is defined and fluid is discharged through the one or more fluid discharge ports, and wherein in the partially open condition the flow path through the apparatus is defined and has a flow area less than the maximum flow area;
   wherein the valve arrangement comprises a piston disposed in an axial bore in the body, the piston operable to move axially in the body between the first condition and the second condition, via the partially open condition,
   wherein the valve arrangement comprises a stem disposed in a bore of the piston, and the piston is arranged to move axially with respect to the stem,
   the stem comprises one or more flow apertures, which are radially oriented in the stem and/or the apparatus,
   wherein the piston comprises a first active piston area formed on a face on an interior profile of the piston, whereby a pressure acting on the first active piston area moves the piston in a first direction relative to the body, and whereby said pressure acting on the first active piston area in the first condition moves the piston from the first condition to the partially open condition when the pressure acting on the first active piston area in the first condition exceeds a predetermined opening pressure,
   and wherein the piston comprises a second active piston area larger than the first active piston area and formed on a face on an exterior profile of the piston, whereby a pressure acting on the second active piston area moves the piston in said same first direction relative to the body, and whereby in the partially open condition the second active piston area becomes active so that pressure acting on the first and second active piston areas in the partially open condition is operable to move the piston from the partially open condition to the second condition of the apparatus when the pressure acting on the first and second active piston areas in the partially open condition exceeds the predetermined opening pressure.

2. The fluid discharge apparatus according to claim 1, wherein the valve arrangement is operable to be cycled between the first condition and the second condition under the effect of a pressurised fluid entering the body from the inlet.

3. The fluid discharge apparatus according to claim 1, comprising a range of the partially open conditions, which are continuous between the first condition and the second condition.

4. The fluid discharge apparatus according to claim 3, wherein at least one of:
   the range of partially open conditions define a range of flow areas of the flow path through the apparatus, which are continuous between the first condition and the second condition; and/or
   the range of partially open conditions defines a range of pressure drops across the apparatus, dependent on a flow rate of fluid through the apparatus, the flow area of the flow path, and pressure.

5. The fluid discharge apparatus according to claim 1, wherein at least one of:
the valve arrangement comprises a cartridge valve; and
the piston is a cartridge piston.

6. The fluid discharge apparatus according to claim 1, wherein at least one of:
the piston comprises a sleeve or spool member;
the piston comprises one or more flow apertures, which are radially oriented in the piston and/or the apparatus.

7. The fluid discharge apparatus according to claim 1, wherein the apparatus defines a first chamber between the inlet and a seal in the valve arrangement.

8. The fluid discharge apparatus according to claim 7, wherein at least one of: the seal is a circumferential seal around the piston; the seal is a circumferential seal between the piston and the body; and the seal is a metal-to-metal seal.

9. The fluid discharge apparatus according to claim 1, wherein the apparatus comprises a biasing means which biases the valve arrangement towards the first condition.

10. The fluid discharge apparatus according to claim 9, wherein one of: the biasing means comprises one or more springs; the biasing means comprises one or more washer springs.

11. The fluid discharge apparatus according to claim 1, wherein at least one of:
one or both of the first and second active piston areas are annular faces;
one or both of the first and second active piston areas are conical annular surfaces.

12. A system comprising the fluid discharge apparatus according to claim 1 and a fluid line coupled to the inlet of the fluid discharge apparatus.

13. A method of cleaning and/or jetting the interior of a fluid conduit, the method comprising:
providing an assembly comprising the fluid discharge apparatus according to claim 1 coupled to the end of a tubing;
locating the assembly in the fluid conduit;
pumping fluid from the fluid source through the tubing to the fluid discharge apparatus;
and interrupting flow of fluid to the one or more discharge ports of the apparatus by moving the valve arrangement between the first condition and the second condition via the partially open condition;
wherein the method comprises moving the piston from the first condition to the partially open condition by pressure acting on the first active piston area, and moving the piston from the partially open condition to the second condition of the apparatus by pressure acting on the first and second active piston areas.

14. The method according to claim 13, wherein the method comprises at least one of:
interrupting the flow of fluid to generate or maintain fluid pressure at the apparatus;
cycling the valve arrangement of the apparatus between the first condition and the second condition.

15. The method according to claim 13, wherein the method comprises at least one of:
deploying the assembly along the fluid conduit;
circulating fluid from the assembly to a deployment location;
returning fluid via an annulus between the tubing and the fluid conduit;
providing a thrust from the apparatus to assist in deployment of the assembly.

16. The method according to claim 13, wherein the fluid conduit is a hydrocarbon production or transportation pipeline.

17. The method according to claim 13, wherein the method comprises deploying the apparatus in multiple stages, with sequentially increasing tubing lengths.

* * * * *